US010764267B2

(12) United States Patent
Mills et al.

(10) Patent No.: US 10,764,267 B2
(45) Date of Patent: Sep. 1, 2020

(54) DEVICE REGISTRATION VIA AUTHENTICATION TRANSFERENCE

(71) Applicant: MOTOROLA SOLUTIONS, INC., Chicago, IL (US)

(72) Inventors: David R. Mills, West Palm Beach, FL (US); Mark A. Boerger, Plantation, FL (US); Thomas J. Senese, Schaumburg, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/044,218

(22) Filed: Jul. 24, 2018

(65) Prior Publication Data
US 2020/0036694 A1    Jan. 30, 2020

(51) Int. Cl.
*H04L 29/06*     (2006.01)
*H04W 12/06*    (2009.01)

(52) U.S. Cl.
CPC .......... *H04L 63/08* (2013.01); *H04L 63/0227* (2013.01); *H04L 63/10* (2013.01);
(Continued)

(58) Field of Classification Search
CPC ..... H04L 63/08; H04L 63/0227; H04L 63/10; H04L 65/102; H04L 65/403; H04L 65/4061; H04W 12/06
(Continued)

(56) References Cited

U.S. PATENT DOCUMENTS 9,860,187 B2    1/2018   Chang et al.
2003/0051041 A1  3/2003   Kalavade et al.
(Continued)

FOREIGN PATENT DOCUMENTS

EP       3179695 A1   6/2017
WO    WO 2015058374   *  4/2015    ............. H04L 29/06

OTHER PUBLICATIONS

Grzesik et al., "Method for automatically authorizing an initial certificate enrollment based on a trusted symmetric encryption key owned by the end device," specification (2014) 7 pages, Motorola Solutions, Inc.
(Continued)

*Primary Examiner* — Mong-Thuy T Tran
(74) *Attorney, Agent, or Firm* — Michael Best & Friedrich LLP

(57) ABSTRACT

A method and system for authenticating a communication device with an application server. The application server includes a gateway registration port, a gateway server port, and an electronic processor. The electronic processor is configured to receive, via the gateway registration port, a registration request, including a unique identifier, from a first device over a first communications network that operates in accordance with a first modality and receive, at the gateway server port, an access request including an identifier from an unknown device over a second communications network that operates in accordance with a second modality. The electronic processor is configured to compare the second identifier with the first identifier to determine if the identifiers match, grant the unknown device access when the identifiers match, and deny the unknown device access when the identifiers do not match.

14 Claims, 4 Drawing Sheets

(52) U.S. Cl.
CPC ........ *H04L 65/102* (2013.01); *H04L 65/403* (2013.01); *H04L 65/4061* (2013.01); *H04W 12/06* (2013.01)

(58) Field of Classification Search
USPC .................................................. 455/411, 519
See application file for complete search history.

(56) References Cited

U.S. PATENT DOCUMENTS

| | | | |
|---|---|---|---|
| 2007/0010275 A1* | 1/2007 | Kiss | H04M 3/42374 455/521 |
| 2009/0097462 A1* | 4/2009 | Ganley | H04W 84/04 370/338 |
| 2012/0036364 A1 | 2/2012 | Yoneda et al. | |
| 2012/0264402 A1 | 10/2012 | Zhang et al. | |
| 2015/0254248 A1* | 9/2015 | Burns | G06F 16/24578 707/749 |
| 2015/0289115 A1* | 10/2015 | Abplanalp | H04W 8/18 455/404.2 |
| 2016/0057051 A1* | 2/2016 | McAndrew | H04L 45/245 370/392 |
| 2016/0105778 A1* | 4/2016 | Szyszka | H04W 4/08 455/519 |
| 2016/0135229 A1* | 5/2016 | Swierczynski | H04W 4/08 455/519 |
| 2016/0212695 A1* | 7/2016 | Lynch | H04W 48/08 |
| 2016/0234711 A1* | 8/2016 | Wang | H04L 61/2592 |
| 2017/0230355 A1 | 8/2017 | Su et al. | |
| 2017/0331827 A1* | 11/2017 | Salyers | H04L 63/029 |

OTHER PUBLICATIONS

Gnutls, Verifying a certificate using trust on first use authentication, website (2001-2018) 8 pages, https://www.gnutls.org/manual/html_node/Verifying-a-certificate-using-trust-on-first-use-authentication.html.

International Search Report and Written Opinion dated Sep. 18, 2019 for related International Application No. PCT/US2019/042054 (15 pages).

* cited by examiner

DEVICE REGISTRATION VIA AUTHENTICATION TRANSFERENCE

BACKGROUND OF THE INVENTION

Public safety personnel (for example, police, fire fighters, first responders, investigators, and the like) may be equipped with portable radios (sometimes referred to as subscriber units) to communicate with each other at an incident scene (for example, a building fire, a robbery, a natural disaster, or other public safety event). Communications among public safety personnel often include sensitive information that, in many cases, should not be shared with non-public safety personnel (e.g., civilians).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
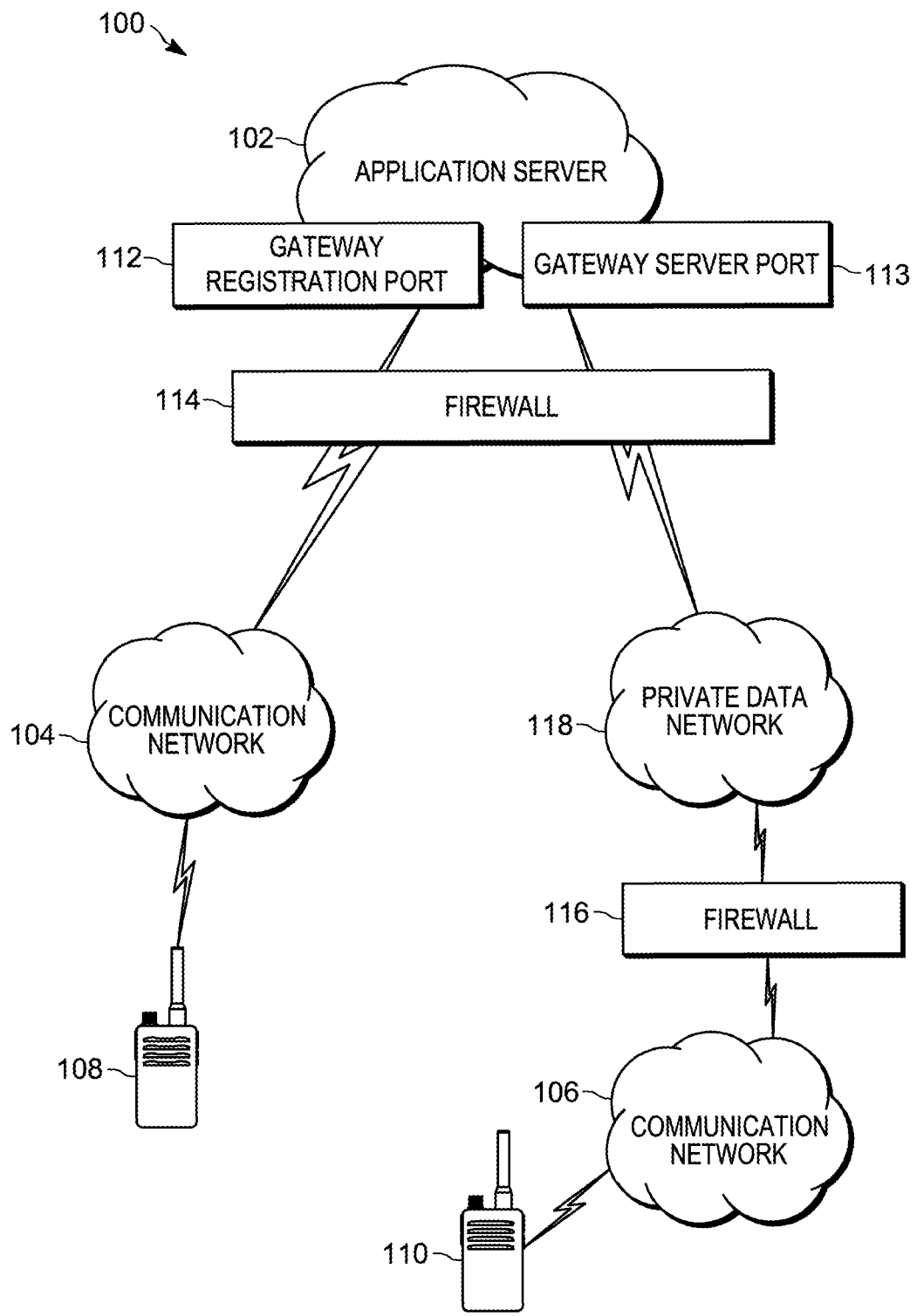
FIG. 1 is a diagram of a communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety personnel may communicate with other public safety personnel at and/or on the way to an incident scene via an electronic communication device (for example, a converged radio (a device capable of communicating via multiple protocols or modalities). These communications may include sensitive information that should not be accessible to others. For example, communications among police officers should not be accessible to suspects or criminals while police are performing an investigation at a crime scene. Communications may be secured by using private shared keys (PSKs), certificates, username and password credentials, and the like. For example, a PSK may be established at a radio or network server and the communication device (for example, a radio). However, PSKs are susceptible to compromise. Communication devices storing the PSKs may be stolen and used by unauthorized personnel to access the secure communications. The PSKs themselves may also be copied or transferred to outside communications equipment by unauthorized personal, allowing the outside equipment to access the secure networks.

Accordingly, systems and methods are provided herein for, among other things, a transference authentication for a communication device (for example, a converged device).

One example embodiment provides a system for authenticating a communication device with an application server. The application server includes a gateway registration port, a gateway server port, and an electronic processor. The electronic processor is configured to receive, at a gateway registration port, a registration request, including a unique identifier, from a first device over a first communications network that operates in accordance with a first modality, and receive, at the gateway server port, an access request including an identification, from a second device over a second communications network that operates in accordance with a second modality. The electronic processor is configured to compare the second identification with the first identification to determine if the second device is the first device, grant the second device access when the second device is the first device, and deny the second device access when the second device is not the first device.

Another example embodiment provides a method for authenticating a communication device with an application server. The method includes receiving, at a gateway registration port of the application server, a registration request from a first communication device over a first communications network that operates in accordance with a first communication modality. The registration request includes a unique identifier of the first communication device. The method also includes receiving, at the gateway server port of the application server, an access request from an unknown communication device over a second communications network that operates in accordance with a second communication modality. The access request includes an identifier of the unknown communication device. The method also includes comparing the identifier of the unknown communication device with the identifier of the first communication device stored at the application server to determine if the unknown communication device is the first communication device. The method also includes granting, in response to determining that the unknown communication device is the first communication device, the unknown communication device access to the application server through the gateway server port, and denying the unknown communication device access to the application server through the gateway server port in response to determining that the unknown communication device is not the first communication device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 2:
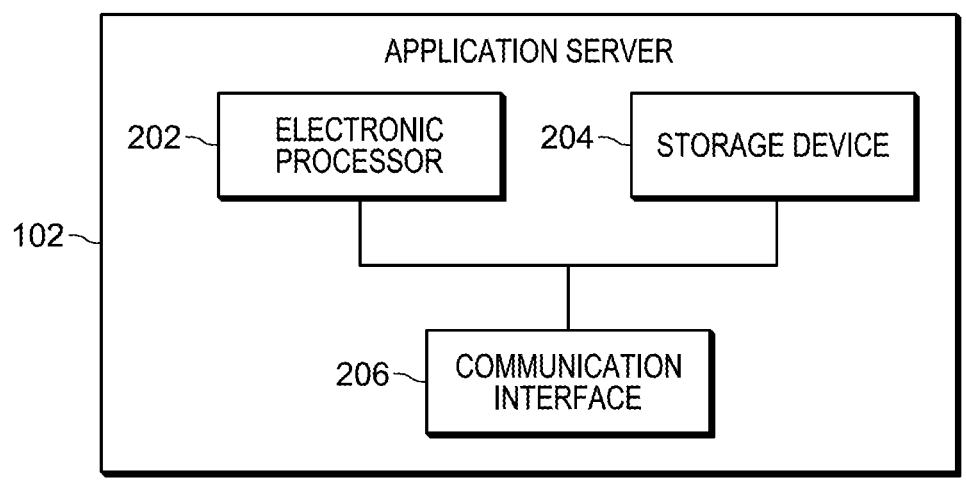
FIG. 2 schematically illustrates an application server included in the communication system of FIG. 1 according to some embodiments.

FIG. 1 illustrates an example communication system 100 for authenticating a communication device in accordance to some embodiments. The system 100 includes an application server 102. The application server 102, described more particularly below with respect to FIG. 2, is communicatively coupled to one or more electronic communication devices (for example, as illustrated in FIG. 1 communication devices 108 and 110), each device being part of either or both a first communications network 104 and a second communications network 106. The application server 102 may include one or more physical server computer systems, virtual private servers (VPSs), (for example, a cloud-based server), and the like. The application server 102 may be configured to execute one or more applications and/or servers in order to provide one or more resources for a registered electronic communication device and/or user. The one or more resources may include one or more applications and/or services, for example, a website, electronic messaging, private database access, and/or any other specific type of resource.

The communications networks 104 and 106 are each a communications network of a modality different from the other. One of the communications networks (for example, the first communications network 104) may be a land mobile radio modality and the other communications network (in this case, the second communications network 106) may be a non-land mobile radio modality (for example, the second communications network 106 may be a broadband network). The first communications network 104 may include a land mobile radio (LMR) network, a P25 LMR network, a terrestrial trunked radio (TETRA) network, or a digital mobile radio (DMR) network. The second communications network 106 may include a wide area network (WAN) (for example, a transport control protocol/internet protocol (TCP/IP) based network, a cellular network, such as, for example, a Global System for Mobile Communications (or Groupe Spécial Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3G network, a 4G network, a 5G network, a device-to-device network, and combinations or derivatives thereof.

As explained in more detail below in regard to FIG. 3, the first and second communications networks 104 and 106 each provide an electronic communication device (for example, electronic communication devices 108 and 110 respectively) a communication path to the application server 102. In particular, the electronic communication device 108 of the communication network 104 communicates/accesses the application server 102 through a gateway registration port 112 while the electronic communication device 110 of the communication network 106 communicates/accesses the application server 102 through a gateway server port 113. The electronic communication devices 108 and 110 may be any kind of electronic device configured to communicate over more than one modality (for example, a converged radio device). As explained in more detail below in regard to FIG. 3, the unknown communication device 110 may either be a different device or is the first communication device 108 requesting to communicate with the application server 102, wherein the request is transmitted via a second modality different from the modality in which the first communication device 108 registered with the application server 102 over.

As also explained in more detail below, in some embodiments, the system 100 further includes one or more firewalls (for example, a first and second firewall 114 and 116). The firewalls 114 and 116 control (allow, reject, or restrict) data communications between the communication devices 108 and 110 respectively and parts of the system 100 over the first and second communications network 104 and 106 respectively. In the illustrated example, the firewall 114 is configured to allow a communication device to exchange data with the application server 102 and to allow a communication device to exchange data with the gateway registration port 112 (for example, and as described in more detail below, to authenticate/register with the gateway registration port 112 for the first time, and to access the application server 102). The firewall 114 may further be configured to reject data communications from a device sent over any other communications network outside the first communications network 104 unless the device, as described below, is registered with the application server 102. The second firewall 116 is configured to block data communications between the application server 102 through the gateway server port 113 and any other electronic communication device over the communication network 106 upon determining that the communication device is not registered with the application server 102. The firewalls 114 and 116 may each be implemented as a stand-alone device, or as part of one of the other components of the communication system 100. The system 100 may also include a private data network 118 between the firewalls 114 and 116.

FIG. 2 schematically illustrates the application server 102 in more detail. In the example provided, the application server 102 includes an electronic processor 202, a storage device 204, and a communication interface 206. The electronic processor 202, the storage device 204, and the communication interface 206 communicate over one or more communication lines or buses, wirelessly, or a combination thereof. It should be noted that the electronic communication devices 108 and 110 may be structured similarly.

The electronic processor 202 may include a microprocessor, application-specific integrated circuit (ASIC), or another suitable electronic device. The electronic processor 202 obtains and provides information (for example, from the storage device 204 and/or the communication interface 206), and processes the information by executing one or more software instructions or modules, capable of being stored, for example, in a random access memory ("RAM") area of the storage device 204 or a read only memory ("ROM") of the storage device 204 or another non-transitory computer readable medium (not shown). The software can include firmware, one or more applications, program data, filters, rules, one or more program modules, and other executable instructions. The electronic processor 202 is configured to retrieve from the storage device 204 and execute, among other things, software related to the control processes and methods described herein.

The storage device 204 can include one or more non-transitory computer-readable media, and includes a program storage area and a data storage area. The program storage area and the data storage area can include combinations of different types of memory, as described herein. In some embodiments, the storage device 204 is a database server, separate from the application server 102. In the example illustrated, the storage device 204 stores, among other things, one or more identifiers of the first electronic communication device 108.

The communication interface 206 may include a transceiver (for example, a Wi-Fi or Ethernet transceiver) for communicating over one or more wired or wireless communications networks or connections.

Figure 3:
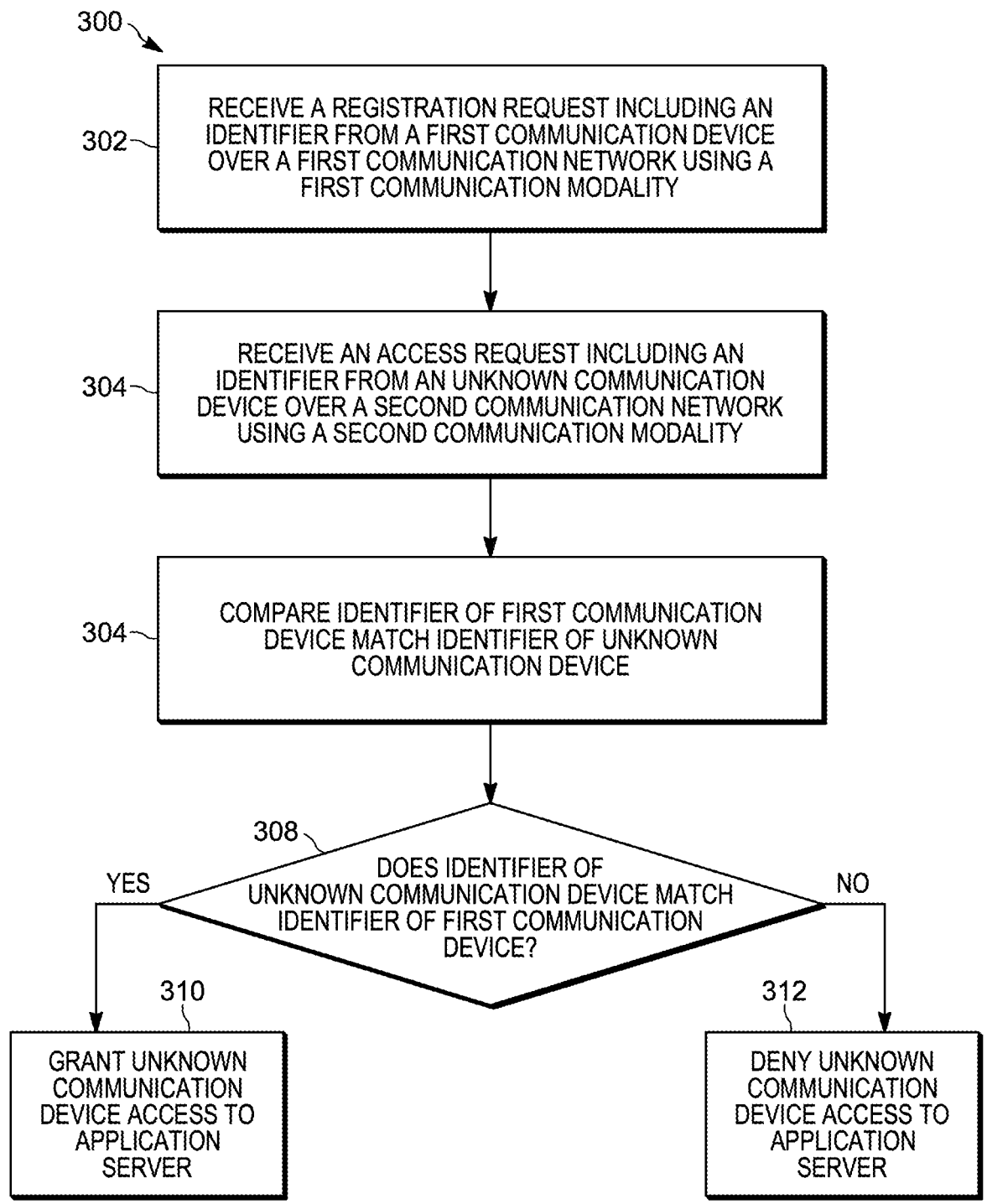
FIG. 3 is a flowchart of a method for authenticating a communication device with the application server of FIG. 1 in accordance with some embodiments.

FIG. 3 illustrates a method 300 for authenticating a communication device with the application server 102. The method 300 is described as being performed by the server 102 and, in particular, the electronic processor 202. However, it should be understood that in some embodiments, portions of the method 300 may be performed by other devices.

At block 302, the application server 102 receives, at the gateway registration port 112, a registration request from the first communication device 108 over the first communications network 106. The registration request includes a unique identifier of the first communication device 108. The identifier may be, for example, an authentication credential and/or an identity (for example, a serial number, a subscriber unit identification) of the first communication device 108 of the first communications network 104. The authentication credential may include one or more of a preshared key (PSK), an identify certificate (for example, a self-signed certificate), and a fingerprint of the identity certificate of the first communication device 108 (in other words, a unique identifier of the certificate). As explained above, the first communications network 104, in the illustrated example, is an LMR communications network.

At block 304, the application server 102 receives, at the gateway server port 113, an access request from an unknown communication device 110 over the second communications network 106. As explained above, the second communications network 106 operates in accordance with a protocol or modality that is different from the protocol or modality of the first communications network 104. In the illustrated example, the second communications network 106 is an LTE communications network. The access request includes an identifier of the unknown communication device 110. The identifier may be similar or of a type related to that of the identifier of the first communication device described above. The application server 102 compares the identifier of the unknown communication device 110 with the identifier of the first communication device 108 to determine if the identifier of the unknown communication device 110 matches the identifier of the first communication device 108 (block 306 and 308). In other words, the application server 102 determines, based on the identifier of the unknown communication device 110, if the unknown communication device 110 has previously been authenticated/registered with the application server 102 via the first modality.

When the application server 102 determines that the unknown communication device 110 is the first communication device 108, the application server 102 grants the unknown communication device 110 access to the server 102 (block 310). When the application server 102 determines that the unknown communication device 110 is not the first communication device 108, the application server 102 denies the unknown communication device 110 access to the application server 102 (block 312).

In some embodiments, the first and the unknown communication devices 108 and 110 may only communicate with the application server 102 through the firewall 114. Likewise, the unknown communication device 110 of the second network 106 may be required to communicate through the second firewall 116, for example, when the modality used by the unknown communication device 110 to request access to the application server 102 is broadband modality. As stated above, the second firewall 116 prevents communication between the application server 102 and any other determined unauthorized devices communicating over the second communications network 106.

Figure 4:
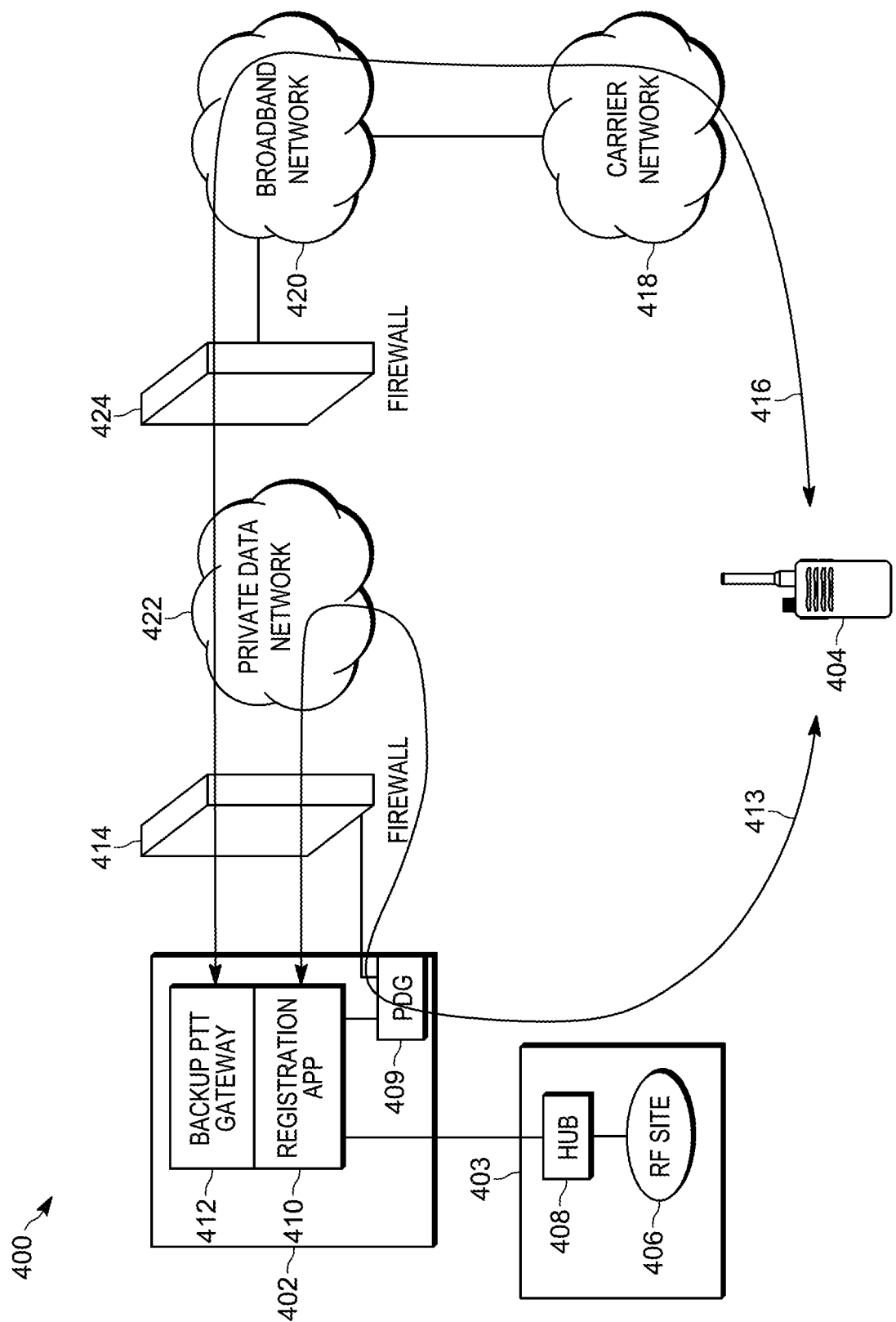
FIG. 4 illustrates a communication system having an application server configured to support a push-to-talk service.

FIG. 4 illustrates an example system 400 in accordance with some embodiments. The system 400 includes components similar to those described above in regard to FIG. 1. The application server 402 is configured to provide access to a back-up push to talk (PTT) P25 land mobile radio network 403 to one or more authenticated/registered communication devices (for example, communication device 404).

The network 403 includes a radio frequency (RF) site 406 and a communications network hub 408 (for example, an ASTRO 25 core). The RF site 406 includes equipment (transmitters, antennas, and the like) for connecting a communication device to the network 403. The communications network hub 408 connects one or more communication devices, data applications, and radio frequency conventional or trunked sites of the network 403 together.

The application server 402 includes a packet data gateway 409, a registration application 410, and a backup PTT gateway 412. The packet data gateway 409 receives and routes data from the communication device 404 based on known addressing methods. The registration application 410 is configured to authenticate and register communication devices communicating over a LMR network for later access to the resources and services provided by the application server 402 backup PTT gateway 412. The registration application 410 performs functions similar to the gateway registration port 112 of FIG. 1. The backup PTT gateway 412 also provides (or denies) communication devices communicating over a communication network different from the LMR network (for example, LTE) access to the resources and services provided by the server 402. In should be noted that the backup PTT gateway 412 performs functions similar to the gateway server port 113 of FIG. 1.

In the example illustrated, the communication device 404 initially has no device certificate or provisioned pre-shared key. As illustrated by communication path 413, the communication device 404 first registers with the application server 402 at the registration application 410 over a P25 LMR network through the packet data gateway 409. The communication device 404 transmits an identifier to the registration application 410. For example, the communication device 404 may generate a self-signed certificate and use the certificate to establish a transport layer security (TLS) session with the registration application 410. Alternatively, the communication device 404 may transmit a self-signed certificate fingerprint and/or a device identification number. In the example provided, communications from the communication device 404 pass through a firewall 414 in order to reach the registration application 410. The registration application 410 receives and, after validating the identifier via the communications network hub 408, stores the identifier (for example, the self-signed certificate, the self-signed certificate fingerprint, and/or the device identification number) and grants the communication device 404 registration and access to the application server 402.

The communication device 404 later requests access to the application server 402 over a non-land mobile radio modality (for example, via a LTE network), illustrated by path 416. The request includes the identifier the communication device 404 previously provided to the registration application 410 (in this case, the self-signed certificate, the self-signed certificate fingerprint, and/or the device identification number). The communication device 404 communicates with the backup PTT gateway 412 over a carrier network 418, a broadband network 420 (in the illustrated embodiment, the Internet), and a private data network 422. As illustrated by the path 416, the communication device 404 now passes through a second firewall 424 in addition to the first firewall 414. The second firewall 424 prevents communication between the application server 102 and other unauthorized communication devices of the broadband network 420. The backup PTT gateway 412 verifies that the identifier provided by the communication device 404 over the LTE network matches a previously stored identifier that was received over the P25 LMR network. When the identifiers match, the backup PTT gateway 412 grants the communication device 404 access to the application server 402. When the identifiers do not match or no match is found at the application server 402, the communication device 404 is denied access to the application server 402.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An application server for authenticating a communication device with a communication system and providing an application, the application server comprising:
   a gateway registration port;
   a gateway server port; and
   an electronic processor configured to:
      receive, via the gateway registration port of the application server, a registration request from a first communication device over a first communications network that operates in accordance with a land mobile radio modality, the registration request including an identifier of the first communication device,
      receive, via the gateway server port of the application server, an access request from an unknown communication device over a second communications network that operates in accordance with a non-land mobile radio modality, the access request including an identifier of the unknown communication device,
      compare the identifier of the unknown communication device with the identifier of the first communication device stored at the application server to determine if the unknown communication device is the first communication device and is authorized to access the application provided by the application server, grant the unknown communication device access to the application provided by the application server through the gateway server port over the non-land mobile radio modality in response to determining that the unknown communication device is the first communication device, and deny the unknown communication device access to the application server through the gateway server port over the non-land mobile radio modality in response to determining that the unknown communication device, based on the comparison, is not the first communication device.

2. The application server of claim 1, wherein the gateway registration port is configured to communicate with the first communication device over the first communications network through a first firewall.

3. The system of claim 2, wherein the gateway server port communicates with the unknown communication device over the second communications network through the first firewall and a second firewall.

4. The system of claim 1, wherein the identifier of the first communication device and the identifier of the unknown communication device include at least one selected from the group consisting of a pre-shared key, an authentication credential, an identity certificate of the first communication device, and a fingerprint of an identity certificate of the first communication device.

5. The system of claim 4, where the identity certificate is a self-signed certificate.

6. The system of claim 1, wherein the first communications network is a P25 Land Mobile Radio network.

7. The system of claim 1, wherein the second communications network is a broadband network.

8. A method for authenticating a communication device with an application server providing an application, the method comprising receiving, at a gateway registration port of the application server, a registration request from a first communication device over a first communications network that operates in accordance with a land mobile radio modality, the registration request including a unique identifier of the first communication device;

receiving, at a gateway server port of the application server, an access request from an unknown communication device over a second communications network that operates in accordance with a non-land mobile radio modality, the access request including an identifier of the unknown communication device;

comparing the identifier of the unknown communication device with the identifier of the first communication device stored at the application server to determine if the unknown communication device is the first communication device and is authorized to access the application provided by the application server;

granting is the first communication device, the unknown communication device access to the application provided by the application server through the gateway server port over the non-land mobile radio modality in response to determining that the unknown communication device is the first communication device based on the comparison; and denying the unknown communication device access to the application server through the gateway server port over the non-land mobile radio modality in response to determining that the unknown communication device, based on the comparison, is not the first communication device.

9. The method of claim 8, wherein the gateway registration port is configured to communicate with the first communication device over the first communications network through a first firewall.

10. The method of claim 9, wherein the gateway server port communicates with the unknown communication device over the second communications network through the first firewall and a second firewall.

11. The method of claim 8, wherein the identifier of the first communication device and the identifier of the unknown communication device include at least one selected from the group consisting of a pre-shared key, an authentication credential, an identity certificate of the first communication device, and a fingerprint of an identity certificate of the first communication device.

12. The method of claim 11, where the identity certificate is a self-signed certificate.

13. The method of claim 8, wherein the first communications network is a P25 Land Mobile Radio network.

14. The method of claim 8, wherein the second communications network is a broadband network.

* * * * *